US005638348A

United States Patent [19]
Kwon

[11] Patent Number: 5,638,348
[45] Date of Patent: Jun. 10, 1997

[54] AUTOMATIC CARTRIDGE-EXCHANGING APPARATUS AND METHOD FOR MINI-DISK PLAYER

[75] Inventor: Chang-Min Kwon, Kyoungki-do, Rep. of Korea

[73] Assignee: Hyundai Electronics Industrial Co., Ltd., Kyungki-do, Rep. of Korea

[21] Appl. No.: 399,602

[22] Filed: Mar. 7, 1995

[30] Foreign Application Priority Data

Mar. 8, 1994 [KR] Rep. of Korea ............... 4447/1994

[51] Int. Cl.$^6$ ............................................. G11B 17/22
[52] U.S. Cl. ................................................... 369/36
[58] Field of Search .................... 369/36, 34, 191, 369/192, 270–271, 262, 258; 360/92, 99.12, 98.08, 98.06, 99.05

[56] References Cited

U.S. PATENT DOCUMENTS

| | | | |
|---|---|---|---|
| 4,800,554 | 1/1989 | Yamasaki et al. | 369/77.2 |
| 4,949,324 | 8/1990 | Arata | 369/36 |
| 5,056,073 | 10/1991 | Fitzgerald et al. | 369/36 |
| 5,177,722 | 1/1993 | Nakamichi et al. | 360/92 |
| 5,184,260 | 2/1993 | Pierrat | 360/92 |
| 5,267,225 | 11/1993 | Fukasawa et al. | 369/36 |

*Primary Examiner*—Stuart S. Levy
*Assistant Examiner*—Allen Cao
*Attorney, Agent, or Firm*—Armstrong, Westerman, Hattori, McLeland & Naughton

[57] ABSTRACT

An automatic cartridge-exchanging apparatus and method is disclosed including a cartridge receiver which can be taken out from the main body of a mini-disk player, and having partitions for receiving a plurality of cartridges; a cartridge holder portion having holder hooks fitted into a pair of semicircular recesses of a cartridge, and a cartridge holder to load/unload an intended cartridge out of the cartridges; and an optical pickup driving portion for driving a bias magnetic coil head for recording or reproducing a disk contained in a cartridge.

23 Claims, 10 Drawing Sheets

AUTOMATIC CARTRIDGE-EXCHANGING APPARATUS AND METHOD FOR MINI-DISK PLAYER

BACKGROUND OF THE INVENTION

The present invention relates to an automatic cartridge-exchanging apparatus and method for a mini-disk player, and more particularly, to an automatic cartridge-exchanging apparatus and method in which a plurality of cartridges containing mini-disks are loaded to automatically select an intended cartridge for the purpose of recording or reproducing.

A mini-disk player is an apparatus for digitally recording or reproducing with a recording medium of a mini-disk (2.5 inch) which is contracted from a conventional compact disk (3.5 inch). With the small recording medium, the mini-disk player can load a plurality of cartridges in its main body. In order to automatically select a loaded cartridge for recording or reproducing, a loading mechanism is mounted on the main body, removing inconveniences in keeping or exchanging the cartridges.

In a conventional technology, only one cartridge is loaded on a cartridge loading apparatus of a mini-disk player. If other cartridges are to be used, the cartridge must be drawn out and exchanged. Cartridges not to be used are inconveniently kept in a separate box.

In another conventional cartridge loading apparatus, 4 cartridges can be exchanged. However, a pickup is fixed to prevent several cartridges from being loaded or unloaded.

In addition, U.S. Pat. No. 5,056,073 granted on Oct. 8, 1991, and entitled "OPTICAL DISK CARTRIDGE HANDLING APPARATUS," discloses an apparatus in which a plurality of cartridges can be selected freely. However, the apparatus is formed in such a manner that the flat surface of an optical disk cartridge is gripped by a rubber or wheel. Further, the grip means and an optical pickup driving portion are placed opposite, complicating the whole mechanism.

SUMMARY OF THE INVENTION

Therefore, it is an object of the present invention to provide an automatic cartridge-exchanging apparatus and method having a cartridge receiver for receiving and loading a plurality of cartridges simultaneously, to thereby automatically select and exchange the cartridges in recording or reproducing in a player.

To accomplish the object of the present invention, there is provided an automatic cartridge-exchanging apparatus comprising: a cartridge receiver which can be taken out from the main body of a mini-disk player like a drawer, and having partitions by a predetermined interval for receiving a plurality of cartridges; a cartridge holder portion having holder hooks fitted into a pair of semicircular recesses of a cartridge, and a cartridge holder driven by a second loading motor, so as to load/unload an intended cartridge out of the cartridges received in the cartridge receiver; and an optical pickup driving portion for driving a bias magnetic coil head for recording or reproducing a disk contained in a cartridge moved from the cartridge receiver by the cartridge holder portion.

To accomplish the object of the present invention, there is provided an automatic cartridge-exchanging method for a mini-disk player comprising the steps of: outputting a driving signal and detecting the present position to simultaneously move a cartridge holder along with an optical pickup driver by a first loading motor, when an instruction for loading a cartridge mounted in a predetermined booth is received; moving said cartridge holder to the cartridge booth by operating a second loading motor; moving hooks of the cartridge holder to be inserted into recesses of the cartridge by the first loading motor; operating the second loading motor to load the cartridge to the optical pickup driver; and driving the first loading motor to move the optical pickup driver to a predetermined position, and fixing the turntable surface of a spindle motor and the central clamp surface of a disk by a magnetic force.

BRIEF DESCRIPTION OF THE ATTACHED DRAWINGS

FIGS. 13A–13L are timing diagrams present at respective components of a loading/discharging mechanism of the present invention.

DETAILED DESCRIPTION OF THE INVENTION

Hereinafter, a preferred embodiment of the present invention will be described in detail with reference to the attached drawings.

Figure 1:
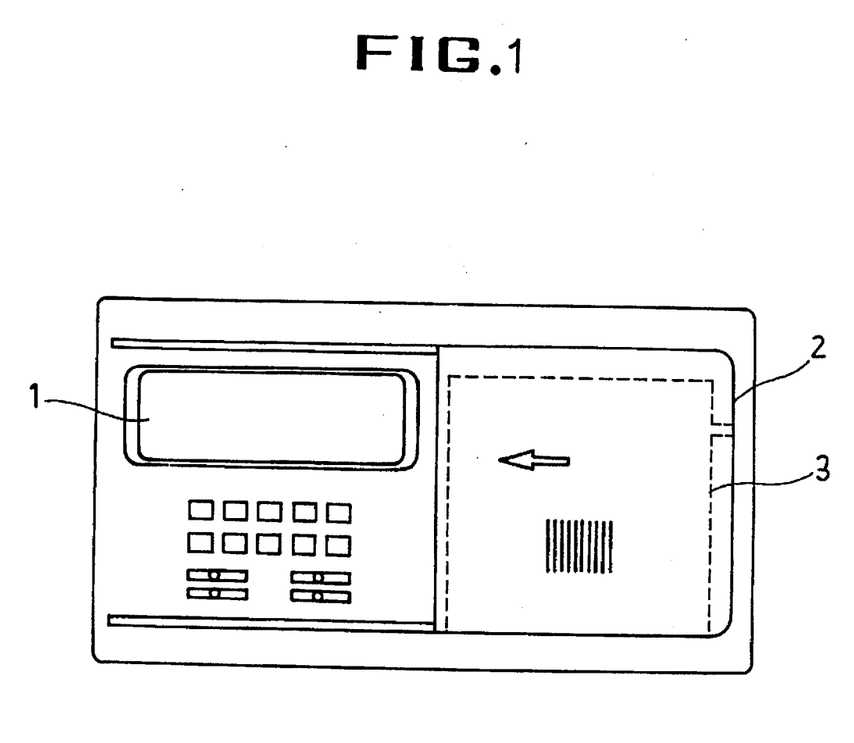
FIG. 1 is a front view of a mini-disk player of the present invention.

Referring to FIG. 1, an automatic cartridge-exchanging apparatus of the present invention comprises a liquid crystal display (LCD) panel 1 for indicating information, manipulation buttons for applying user-controlled commands, a cartridge receiver cover 2, and a cartridge receiver 3 for receiving a cartridge after moving cover 2 to the left.

Figure 2:
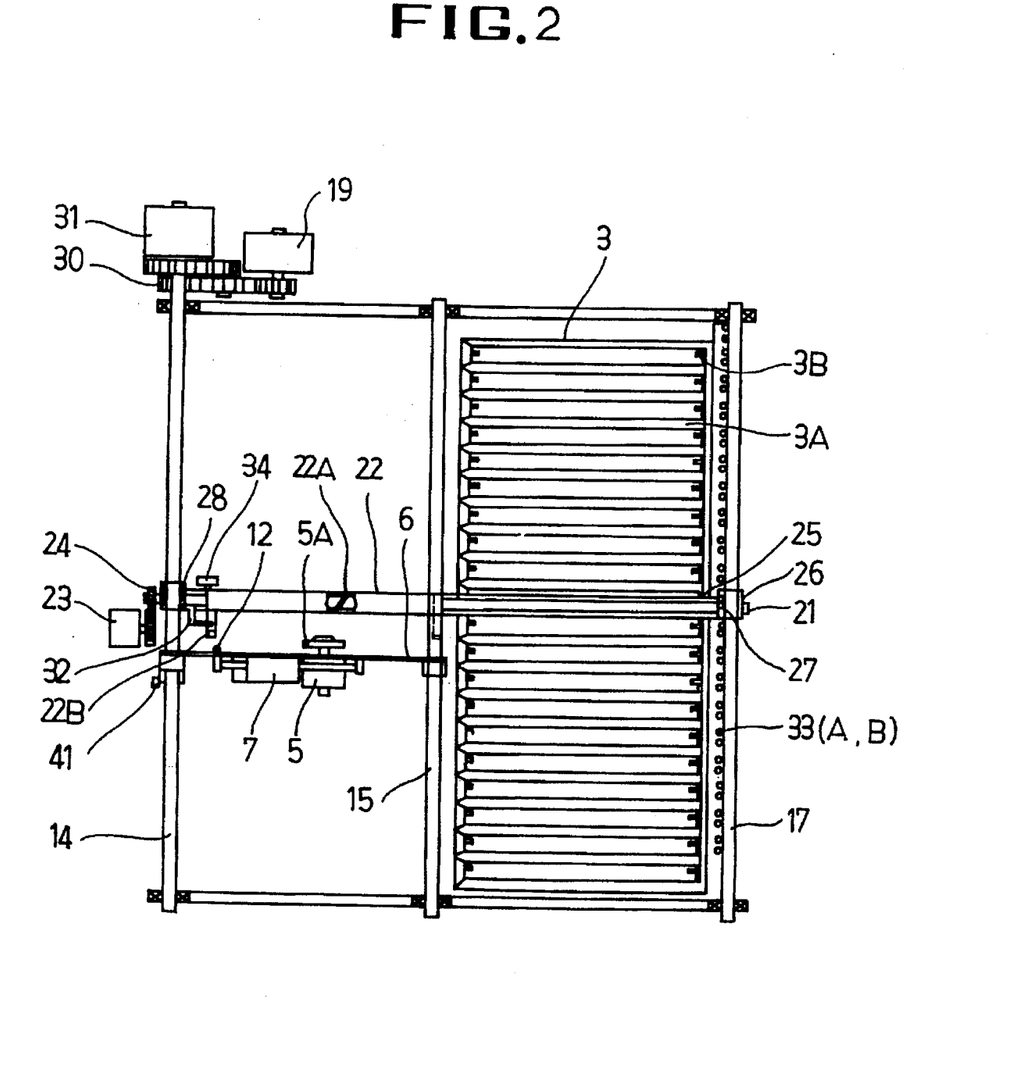
FIG. 2 is a plan view of an automatic cartridge-exchanging apparatus of the present invention.

Referring to FIG. 2, there is shown a state in which a loading mechanism stops at a position where an intended cartridge 4 can be loaded. The loading mechanism can move back and forth. In this embodiment, the number of cartridges to exchange is 20, for instance.

Figure 10:
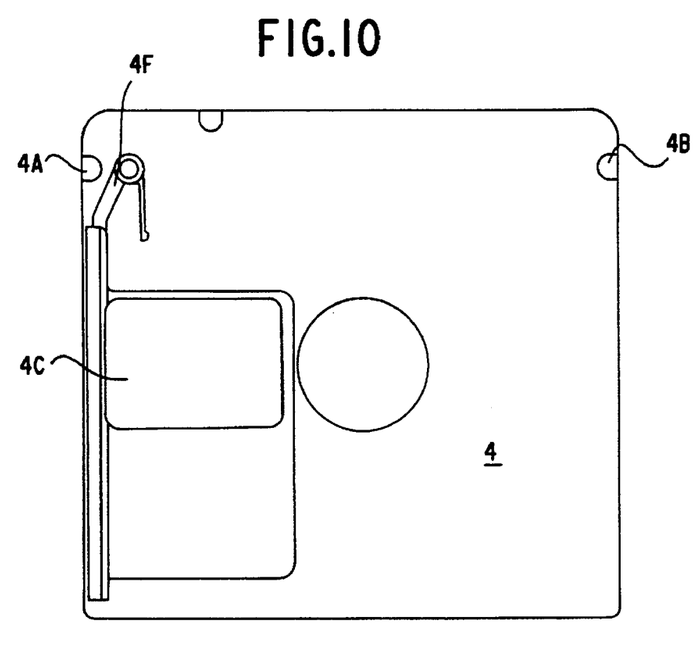
FIG. 10 is a front view of a cartridge used in the automatic cartridge-exchanging apparatus of the present invention.
Figure 11:
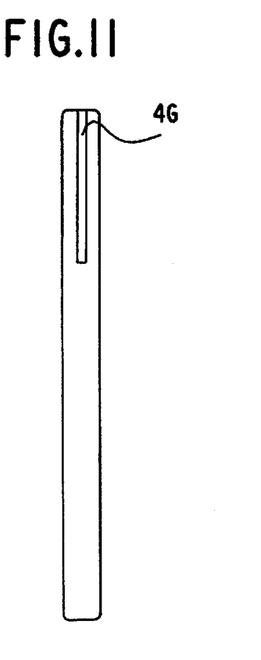
FIG. 11 is a side view of the cartridge used in the automatic cartridge-exchanging apparatus of the present invention.

The cartridge used in the present invention comprises, as shown in FIGS. 10 and 11, semicircular recesses 4A and 4B formed on both upper sides thereof, a shutter 4C to be opened in recording or playback, a shutter lock 4F for opening the shutter, and a slit 4G formed on one side of the cartridge. In this configuration, when shutter lock 4F is pressed by a predetermined device, shutter 4C falls.

Figure 3:
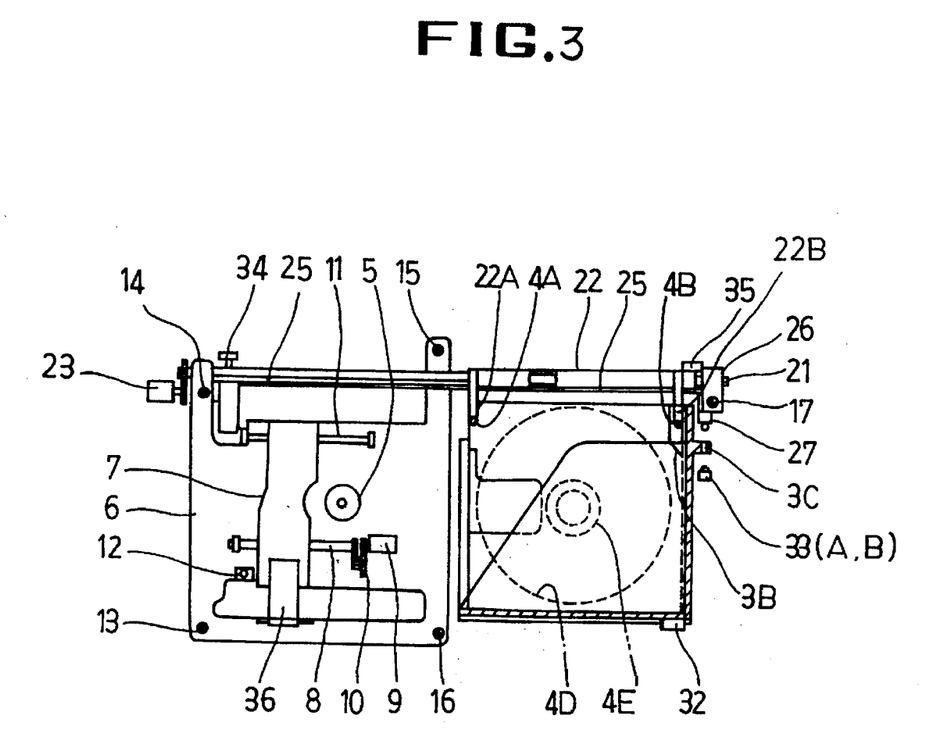
FIG. 3 is a front view in which a cartridge holder of the present invention is shifted to the position of a cartridge receiver.
Figure 8:
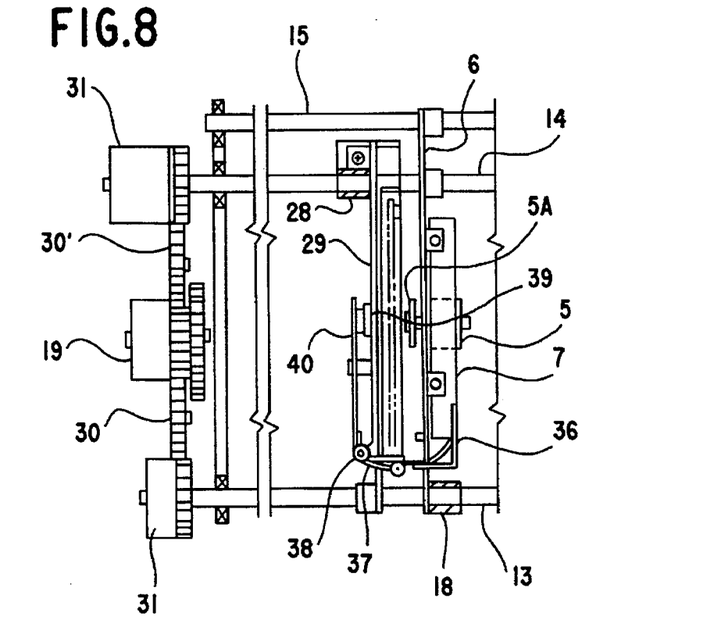
FIG. 8 is a detailed side view in which the cartridge is inserted into the optical pickup in FIG. 6.

In the optical pickup driver of FIG. 2, a spindle motor 5 is fixed to a plate 6. As shown in FIG. 3, to plate 6 are also fixed two shafts 8 and 11 so as to enable optical pickup 7 to move rectilinearly. Of the two shafts, one is a lead screw 8 with a trapezoid spiral, which is connected to a pickup motor 9 to thereby transmit force to optical pickup 7 through a gear portion 10. The other is a simple guide shaft 11. A third sensor 12 is fixed to plate 6, a magnetic head apparatus or bias magnetic coil head 39 to optical pickup 7, as shown in FIG. 8. In this drawing, a first positioner 18 connected to plate 6 is inserted to move rectilinearly by a first axis 13 having a trapezoid spiral. First axis 13 rotates by a first motor 19 and a gear portion 30.

Cartridge holder 22 is mounted on a sixth axis 21 having a screw 22A so as to load cartridge 4 in cartridge receiver 3, and move toward the optical pickup driver or reversely. At both ends of cartridge holder 22, L-shaped holder hooks 22A and 22B are provided to be inserted into semicircular recesses 4A and 4B (refer to FIG. 10) placed upper end portions of cartridge 4. A second motor 23 for transmitting force to sixth axis 21 rotates sixth axis 21 via a gear portion 24 so that cartridge holder 22 moves left and right. By doing so, cartridge 4 is able to be loaded or unloaded.

Figure 12:
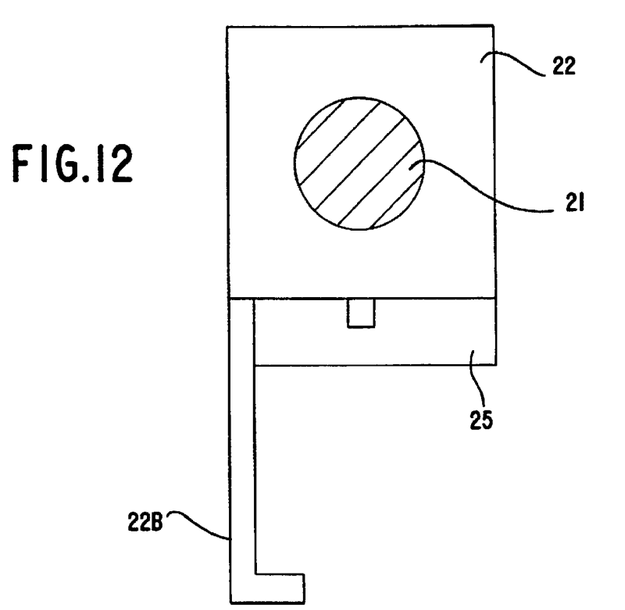
FIG. 12 is a cross-sectional view of FIG. 3 cut along line A—A.

Referring to FIG. 12, a holder bracket 25 in which one end is fixed to guide 26 is installed on the bottom of cartridge holder 22 so that the cartridge holder does not rotate due to the rotation of sixth axis 21, but moves left and right. A guide 26 is further comprised for connection of sixth axis 21 to a fifth axis 17 so that the sixth axis moves along the fifth axis. A light-emitting sensor 27 for detecting the position of the cartridge holder for the purpose of loading cartridge 4 is attached to the lower portion of the cartridge holder portion. The light signal between light-emitting sensor 27 and light receiving sensors 33A and 33B attached to cartridge receiver 4 serves to indicate the position detection and present position of the cartridge holder to a control circuit of the mechanism.

As shown in FIG. 8, in the cartridge holder, a second positioner 28 is inserted into second axis 14 so that the cartridge holder reciprocates by the second axis having a trapezoid spiral. The second axis 14 rotates by a first motor 19, a gear portion 30, and a clutch 31 for turning on/off force transmission. First, third and fourth axes 13, 15 and 16 act as guides. At the left end of cartridge holder bracket 25, there is provided a shutter opener 32 for opening cartridge shutter 4C while cartridge 4 is loaded on the optical pickup driver. When cartridge 4 almost reaches a loading position, shutter lock 4F of cartridge 4 is pushed by the shutter opener 32, and shutter 4C falls downward. Then, a disk in the cartridge enters the driving area of the objective lens and magnetic head of optical pickup 7.

Referring to FIG. 3, cartridge receiver 3 is constructed to be attachable or detachable from the main body of a player like a drawer. In the cartridge receiver, partitions 3A are installed vertically by a predetermined interval so as to load many (about 20 which takes 160 mm in length) cartridges. Partitions 3A are shaped like a trapezoid. The sectional area of partitions 3A is smaller than that of cartridge 4, with the top length being shorter than the bottom length. In addition, the left side is curved to easily draw out the cartridge. The partitions can be modified in various forms.

To prevent a false loading of cartridge 4, a false-loading preventing stop 3B is provided on the upper right portion of cartridge receiver 3. With this, it is easily detected a case when the loading direction of cartridge 4 is not proper. If the false-loading preventing stop is properly inserted into lengthwise recess 4G formed on the side of the cartridge of FIG. 11, the cartridge is regarded as being properly put into the receiver. A fourth sensor 32 is attached to the lower right portion of the cartridge receiver so as to detect whether cartridge 4 is loaded on respective (20) booths or not. The cartridge holder portion comprises a light-emitting sensor 27 for detecting the position of cartridge in loading or drawing out thereof. A hole 3C is formed at a portion extending from the receiver so as to detect a light signal to be emitted from light-emitting sensor 27. The load number of cartridges can be confirmed by fourth sensor 32 through a display 1.

Figures 13A, 13L:
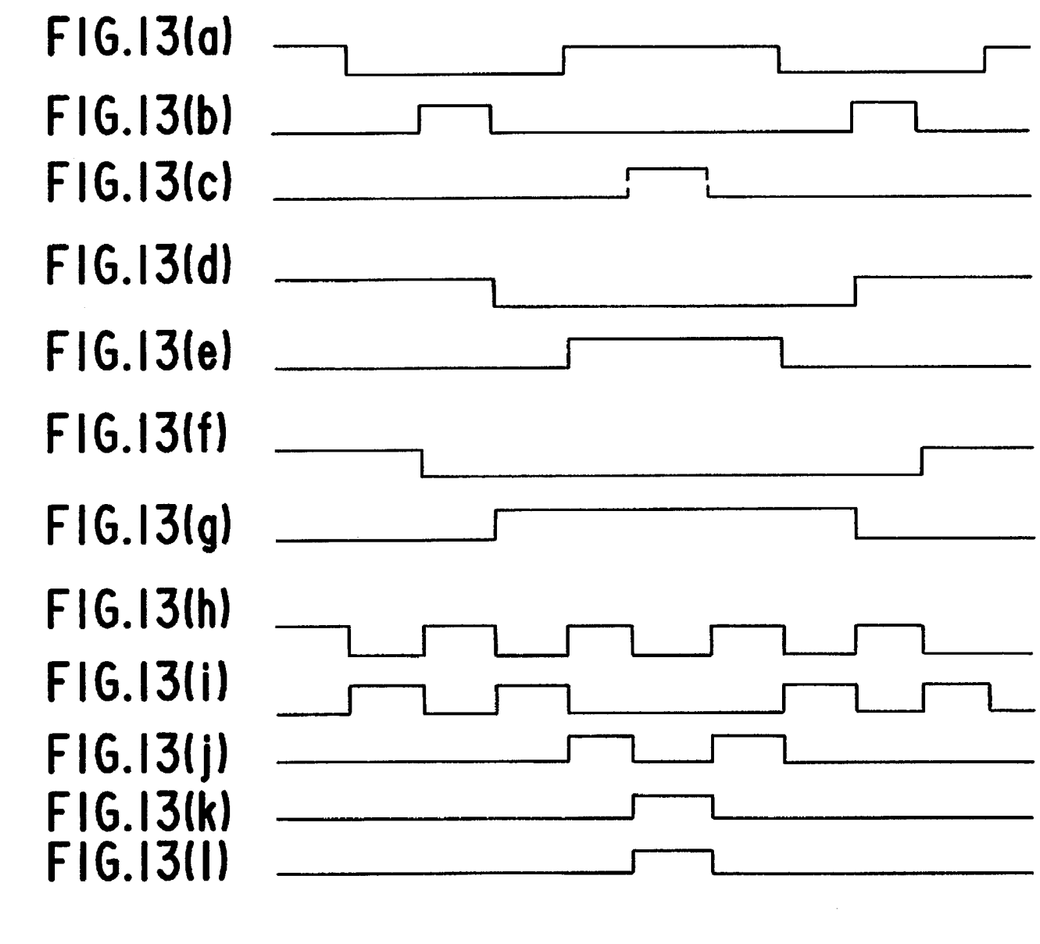

FIG. 13A illustrates the waveform of a signal of a first sensor 34. FIG. 13B illustrates the waveform of a signal of a second sensor 35. FIG. 13C illustrates the waveform of a signal of third sensor 12. FIG. 13D illustrates the waveform of fourth sensor 32. FIG. 13E illustrates the waveform of a signal of fifth sensor 41. FIG. 13F illustrates the waveform of a light-receiving sensor 33A. FIG. 13G illustrates the waveform of a light-receiving sensor 33B. FIG. 13H illustrates the waveform of a signal of a first loading motor 19. FIG. 13I illustrates the waveform of a signal of a second loading motor 23. FIG. 13J illustrates the waveform of a signal of clutch 31. FIG. 13K illustrates the waveform of a signal of a pickup motor 9. FIG. 13L illustrates the waveform of spindle motor 15.

Hereinafter, one cycle of operation of the loading/discharging mechanism of FIGS. 13A–13L will be described.

First, in the first loading step, if an instruction to load cartridge 4 mounted on a booth is received from an operation button, a system controller (not shown) outputs a driving signal. If so, light-receiving sensor 33A detects the present position so that first loading motor 19 is driven to simultaneously move the cartridge holder portion and optical pickup driver. This operation is the first loading step for FIG. 2.

Figure 4:
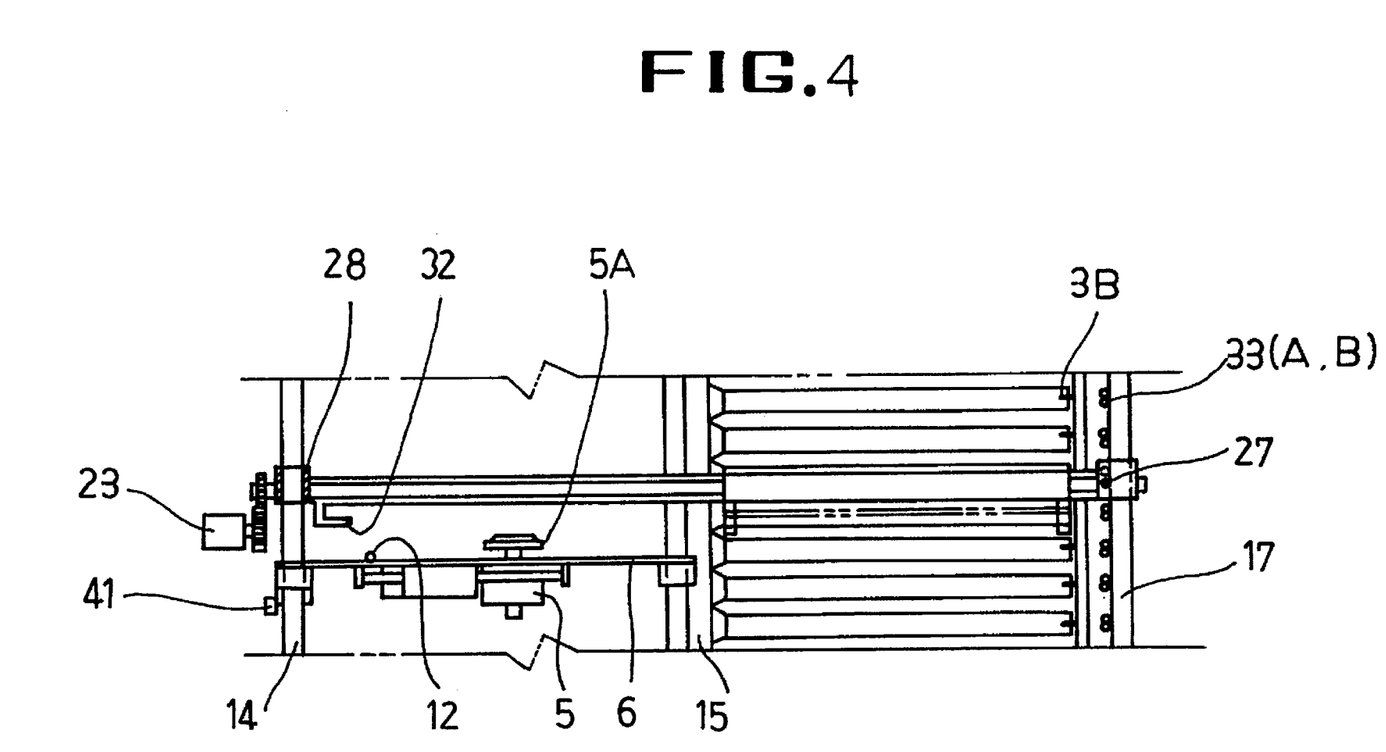
FIG. 4 is a plan view in which the cartridge holder of the present invention moves to the position of the cartridge receiver.

In the second loading step, light-receiving sensor 33A designates an intended booth of cartridge 4. When the cartridge holder portion arrives at the booth, first sensor 34 is turned off and second loading motor 23 operates to move the cartridge holder portion to the right, as shown in FIGS. 3 and 4. The second loading motor 23 stops by second sensor 35. In this state, the cartridge holder portion is placed on partition 3A of the receiver, and the cartridge is not held yet, as shown in FIG. 4.

Figure 5:
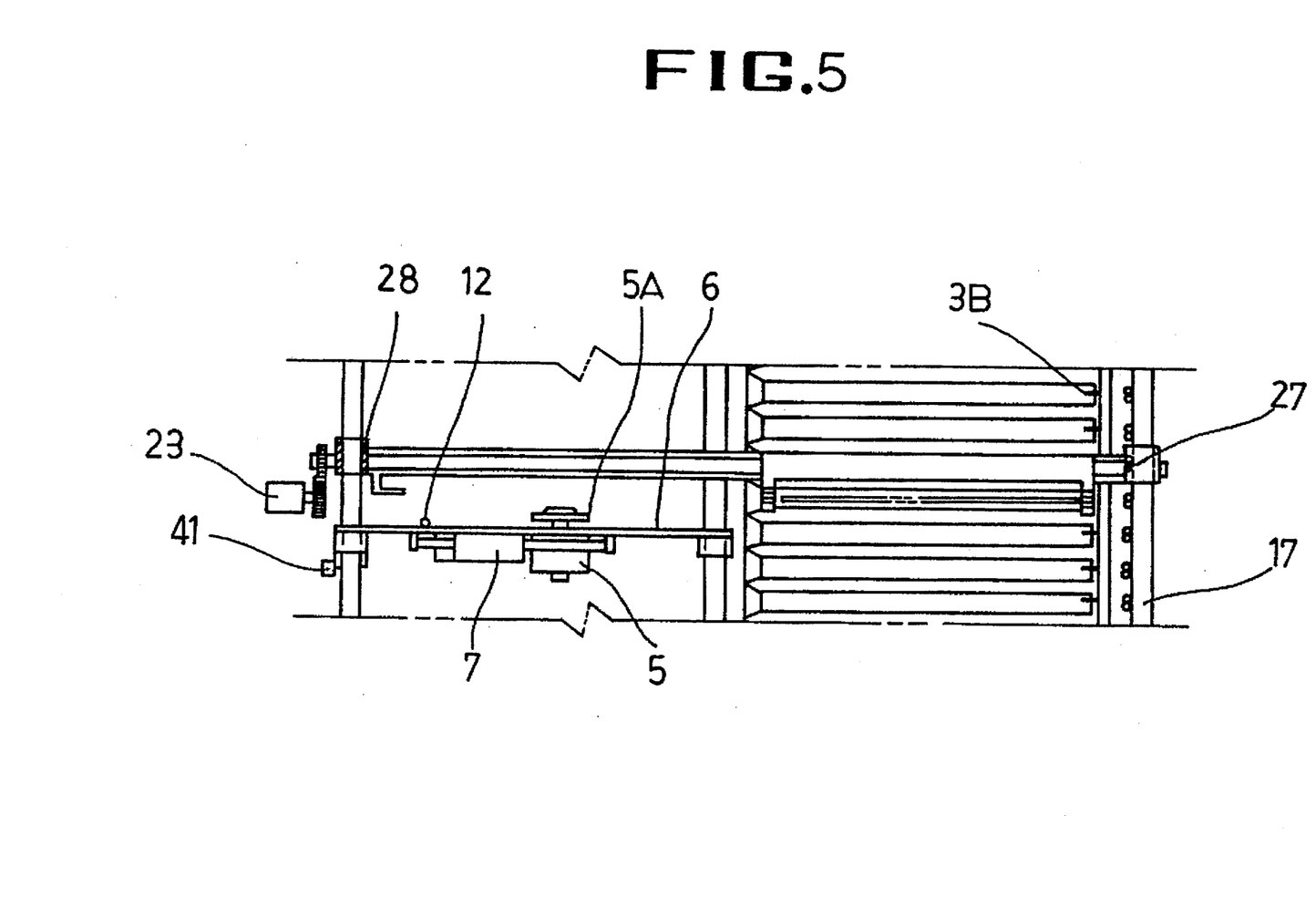
FIG. 5 is a plan view in which the cartridge holder of the present invention moves further toward the cartridge holder from the position of FIG. 4.

In the third loading step, first loading motor 19 re-operates to move the cartridge holder slightly upward in FIG. 5 so that hooks 22A and 22B of cartridge holder 22 are inserted into recesses 4A and 4B of cartridge 4. The movement stops when light-receiving sensor 33B is detected. The cartridge holder portion moves until light-receiving sensors 33A and 33B of a predetermined booth of cartridge 4.

Figure 6:
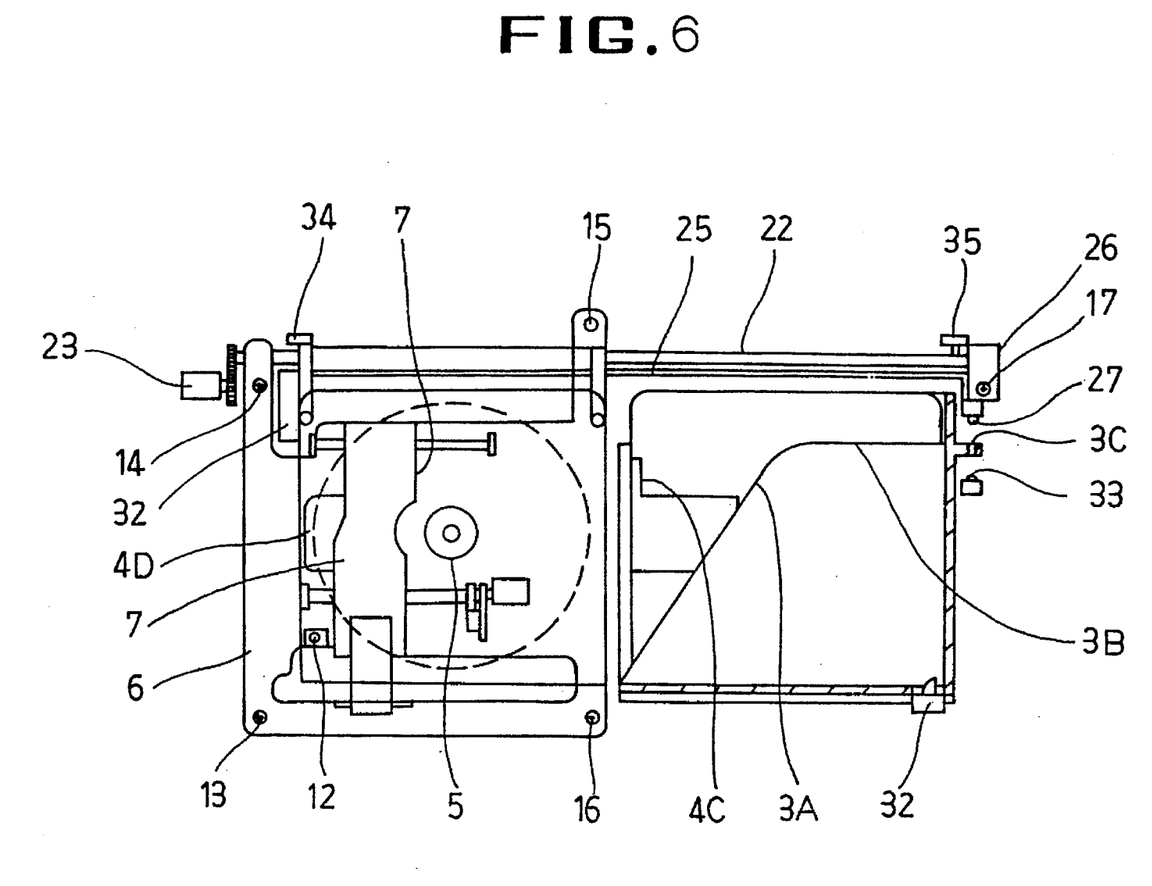
FIG. 6 is a front view in which a cartridge is shifted from the position of FIG. 3 to the position of an optical pickup driver by the cartridge holder of the present invention.
Figure 7:
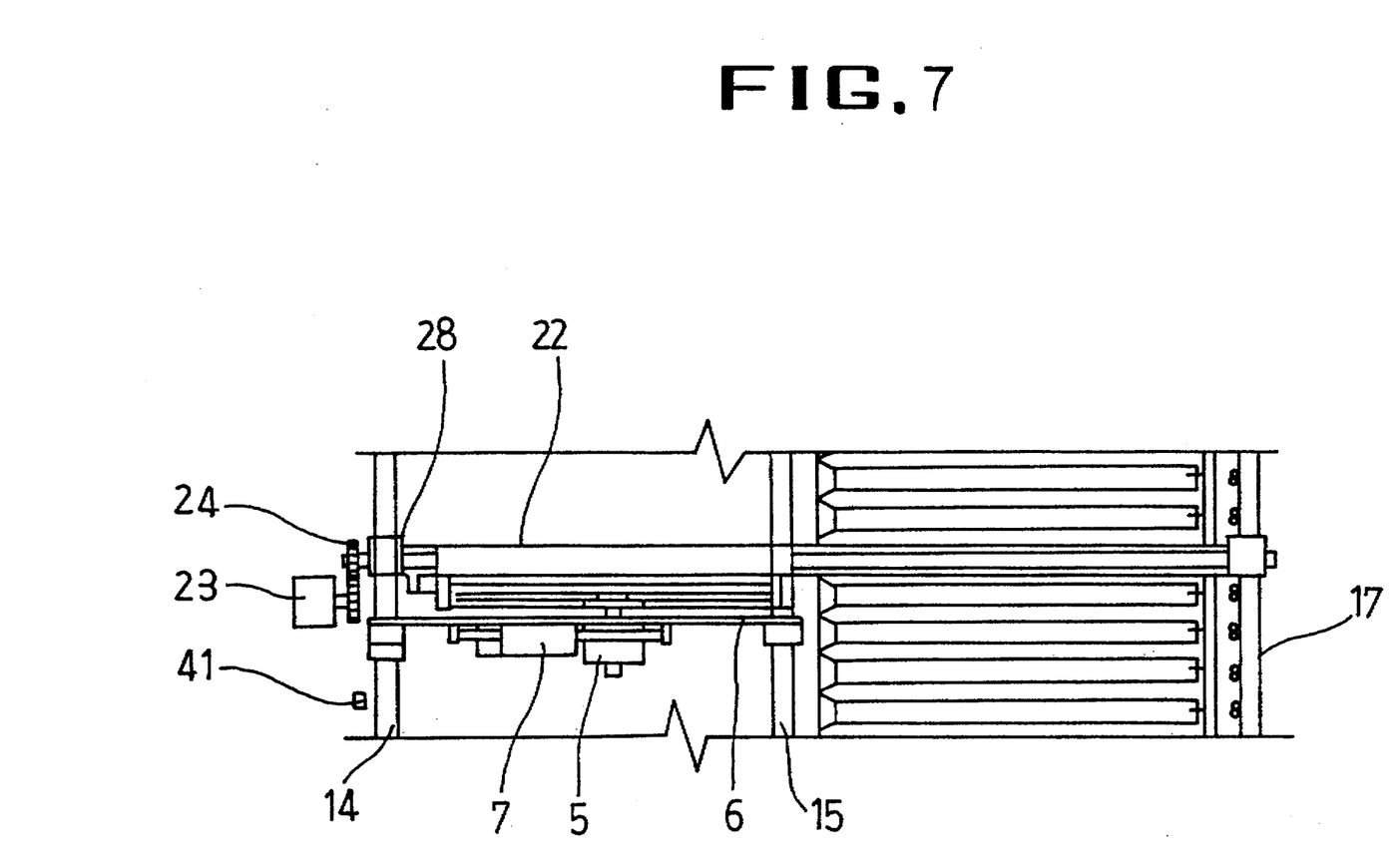
FIG. 7 is a partially enlarged plan view of FIG. 6.

In the fourth loading step, second loading motor 23 operates to move the cartridge holder portion holding the cartridge to the left so that cartridge 4 is shifted to the optical pickup driver. When the cartridge reaches the position as shown in FIGS. 6–8, first sensor 34 is detected to stop second loading motor 23.

Figure 9:
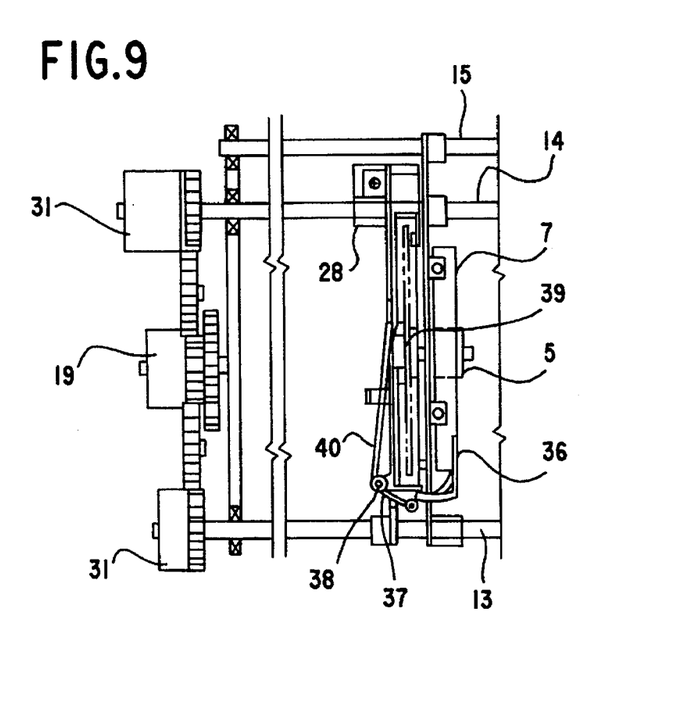
FIG. 9 is a side view showing a loading-finished state in which in FIG. 8, the optical pickup driver magnetically chucks a disk of the cartridge on the turntable surface of a spindle motor for the purpose of recording or reproducing.

In the fifth loading step, first loading motor 19 re-operates to move the optical pickup driver from the position of FIG. 8 to the position of FIG. 9. The turntable surface 6 of spindle motor 5 and central clamp surface 4E of disk 4D are fixed by a magnetic force. After the fifth loading step, the loading mode is finished. In the fifth loading step, clutch 31 operates to turn on/off the force of first loading motor 19, and only the optical pickup driver is shifted and stopped by third sensor 12. In other words, from the first to fourth loading steps, first and second axes are simultaneously moved to shift the cartridge holder portion and optical pickup driver at the same time by a predetermined interval. However, in the fifth loading step, only the optical pickup driver is moved.

In the optical pickup driver, the magnetic head apparatus fixed on the bottom of optical pickup 7 is constructed so that head arm bracket 36 pushes head arm 37 to move magnetic head 39 to the coated surface of disk 4D, centering on a hinge 38. In recording or reproducing, magnetic head 39 is always in contact with the disk surface, as shown in FIG. 9. This method is established as a regulation so as not to create a problem even though disk 4D rotates, while head holder 40 embracing magnetic head 39 comes into contact with the coated surface of the disk.

In a stop mode, pickup motor 9 and spindle motor 5 stop. In a unload mode, the first to fifth loading steps are performed reversely.

In the first and second discharging steps, the optical pickup driver is detached from disk 4D due to the rotation of first loading motor 19, and stops by fifth sensor 41. Cartridge 4 is unloaded and moves to the cartridge receiver by the cartridge holder portion. Second loading motor 23 is stopped by third and fourth sensors 12 and 32.

In the third discharging step, second loading motor 23 stops, and first loading motor 19 operates to detach cartridge holder 22 from cartridge 4 and restore the holder to the original state. The third unload step is shown in FIG. 4. The second and third discharging steps are performed according to a signal system starting from light-receiving sensor 33B and stopped at light-receiving sensor 33A. Finally first loading motor 19 stops, and second loading motor 23 is driven to restore the cartridge holder to the position shown in FIG. 2.

As described above, in the present invention, a mechanism having a cartridge receiver for receiving and loading a plurality of cartridges simultaneously is mounted to allow the automatic selection and exchange of cartridges so that recording or reproducing is performed while the mechanism is inserted into the main body of a player, with the cartridges being received. The mechanism operates by sensors and motors. As a result, the present invention eliminates inconveniences of exchanging cartridges every time. In addition, the cartridge receiver needs not to be drawn out after use, allowing the cartridge to be kept.

What is claimed is:

1. An automatic cartridge-exchanging apparatus in a mini-disk player, said automatic cartridge-exchanging apparatus comprising:

a frame including first, second, third, fourth and fifth spaced parallel shaft means and a sixth perpendicular shaft means, said shaft means for serving as axes of rotation and said second shaft means being driven by a first motor;

a cartridge receiver means located within said frame for receiving a plurality of cartridges in said mini-disk player, said cartridge receiver means being slidably removable from a main body portion of said mini-disk player and having partition means at predetermined intervals, said partition means forming booths for holding said cartridges;

a cartridge holder means, driven by a second motor, for holding an intended cartridge which has been loaded/unloaded from said plurality of cartridges in said cartridge receiver means, said cartridge holder means having a cartridge holder portion with holder hook means for fitting into a pair of semicircular recesses of any one cartridge of said plurality of cartridges;

first, second and third sensor means for sensing movement during loading/unloading of said intended cartridge in order to turn on/off said first and second motors;

a first positioner means on said first shaft means for positioning said first shaft means so as to move a plate rectilinearly;

an optical pickup driving means for driving a bias magnetic coil head for digitally recording or reproducing a mini-disk contained in said any one cartridge of said plurality of cartridges moved from said cartridge receiver means by said cartridge holder portion;

wherein said cartridge holder means moves by a lead screw of said sixth shaft means; and wherein a holder bracket is fixedly installed on a bottom of said cartridge holder means so that said cartridge holder means is prevented from rotating around said sixth shaft means.

2. The automatic cartridge-exchanging apparatus as claimed in claim 1, further comprising a fourth sensor means installed between said partition means so as to easily detect whether said any one cartridge, of said plurality of cartridges, is present or absent, and to thereby confirm what number of said plurality of cartridges have been loaded through a display onto said cartridge receiver means.

3. The automatic cartridge-exchanging apparatus as claimed in claim 1, wherein said partition means are formed in such a manner that a cross-sectional area of said partition means is smaller than a cross-sectional area of said any one of said plurality of cartridges, an upper length of said partition means is shorter than a lower length of said partition means, and a side of said partition means is curved and slanted.

4. The automatic cartridge-exchanging apparatus as claimed in claim 1, wherein a false-loading preventing stop is formed on an upper right portion of said cartridge receiver means, so as to detect when a receiving direction of said any one of said plurality of cartridges is not proper.

5. The automatic cartridge-exchanging apparatus as claimed in claim 1, wherein in order to load/unload said cartridge, a light receiving sensor is provided in respective booths in said cartridge holder portion so that said holder hook means of said cartridge holder means move exactly to a position of said recesses of said any one of said plurality of cartridges.

6. The automatic cartridge-exchanging apparatus as claimed in claim 1, further comprising a second positioner connected to a cartridge guide and inserted into said second shaft means so as to allow said cartridge holder means to reciprocate around said second shaft means, and a first, third and fourth shaft means serve as guides, said second shaft means being rotated by said first motor, a gear portion, and a clutch capable of turning a transmission of energy to said first and second motors on and off.

7. The automatic cartridge-exchanging apparatus as claimed in claim 1, wherein in said optical pickup driving means, as said bias magnetic coil head is driven, a head arm bracket attached to said optical pickup driving means pushes a head arm so that a magnetic head is driven to a coated surface of said mini-disk, when a turntable surface of a spindle motor is chucked to a clamped portion of said mini-disk.

8. An automatic cartridge-exchanging apparatus in a mini-disk player, said automatic cartridge-exchanging apparatus comprising:
- a frame including first, second, third, fourth and fifth spaced parallel shaft means and a sixth perpendicular shaft means, said shaft means for serving as axes of rotation and said second shaft means being driven by a first motor;
- a cartridge receiver means located within said frame for receiving a plurality of cartridges in said mini-disk player, said cartridge receiver means being slidably removable from a main body portion of said mini-disk player and having partition means at predetermined intervals, said partition means forming booths for holding said cartridges;
- a cartridge holder means, driven by a second motor, for holding an intended cartridge which has been loaded/unloaded from said plurality of cartridges in said cartridge receiver means, said cartridge holder means having a cartridge holder portion with holder hook means for fitting into a pair of semicircular recesses of any one cartridge of said plurality of cartridges;
- first, second and third sensor means for sensing movement during loading/unloading of said intended cartridge in order to turn on/off said first and second motors;
- a first positioner means on said first shaft means for positioning said first shaft means so as to move a plate rectilinearly;
- an optical pickup driving means for driving a bias magnetic coil head for digitally recording or reproducing a mini-disk contained in said any one cartridge of said plurality of cartridges moved from said cartridge receiver means by said cartridge holder portion; and
- a second positioner connected to a cartridge guide and inserted into said second shaft means so as to allow said cartridge holder means to reciprocate around said second shaft means, and a first, third and fourth shaft means serve as guides, said second shaft means being rotated by said first motor, a gear portion, and a clutch capable of turning a transmission of energy to said first and second motors on and off.

9. The automatic cartridge-exchanging apparatus as claimed in claim 8, further comprising a fourth sensor means installed between said partition means so as to easily detect whether said any one cartridge, of said plurality of cartridges, is present or absent, and to thereby confirm what number of said plurality of cartridges have been loaded through a display onto said cartridge receiver means.

10. The automatic cartridge-exchanging apparatus as claimed in claim 8, wherein said partition means are formed in such a manner that a cross-sectional area of said partition means is smaller than a cross-sectional area of said any one of said plurality of cartridges, an upper length of said partition means is shorter than a lower length of said partition means, and a side of said partition means is curved and slanted.

11. The automatic cartridge-exchanging apparatus as claimed in claim 8, wherein a false-loading preventing stop is formed on an upper right portion of said cartridge receiver means, so as to detect when a receiving direction of said any one of said plurality of cartridges is not proper.

12. The automatic cartridge-exchanging apparatus as claimed in claim 8, wherein said cartridge holder means moves by a lead screw of said sixth shaft means.

13. The automatic cartridge-exchanging apparatus as claimed in claim 12, wherein a holder bracket is fixedly installed on a bottom of said cartridge holder means so that said cartridge holder means does not rotate around said sixth shaft means.

14. The automatic cartridge-exchanging apparatus as claimed in claim 8, wherein in order to load/unload said cartridge, a light receiving sensor is provided in respective booths in said cartridge holder portion so that said holder hook means of said cartridge holder means move exactly to a position of said recesses of said any one of said plurality of cartridges.

15. The automatic cartridge-exchanging apparatus as claimed in claim 8, wherein in said optical pickup driving means, as said bias magnetic coil head is driven, a head arm bracket attached to said optical pickup driving means pushes a head arm so that a magnetic head is driven to a coated surface of said mini-disk, when a turntable surface of a spindle motor is chucked to a clamped portion of said mini-disk.

16. An automatic cartridge-exchanging apparatus in a mini-disk player, said automatic cartridge-exchanging apparatus comprising:
- a frame including first, second, third, fourth and fifth spaced parallel shaft means and a sixth perpendicular shaft means, said shaft means for serving as axes of rotation and said second shaft means being driven by a first motor;
- a cartridge receiver means located within said frame for receiving a plurality of cartridges in said mini-disk player, said cartridge receiver means being slidably removable from a main body portion of said mini-disk player and having partition means at predetermined intervals, said partition means forming booths for holding said cartridges;
- a cartridge holder means, driven by a second motor, for holding an intended cartridge which has been loaded/unloaded from said plurality of cartridges in said cartridge receiver means, said cartridge holder means having a cartridge holder portion with holder hook means for fitting into a pair of semicircular recesses of any one cartridge of said plurality of cartridges;
- first, second and third sensor means for sensing movement during loading/unloading of said intended cartridge in order to turn on/off said first and second motors;
- a first positioner means on said first shaft means for positioning said first shaft means so as to move a plate rectilinearly;
- an optical pickup driving means for driving a bias magnetic coil head for digitally recording or reproducing a mini-disk contained in said any one cartridge of said plurality of cartridges moved from said cartridge receiver means by said cartridge holder portion; and
- wherein said optical pickup driving means, as said bias magnetic coil head is driven, a head arm bracket attached to said optical pickup driving means pushes a head arm so that a magnetic head is driven to a coated surface of said mini-disk, when a turntable surface of a spindle motor is chucked to a clamped portion of a mini-disk.

17. The automatic cartridge-exchanging apparatus as claimed in claim 16, further comprising a fourth sensor means installed between said partition means so as to easily detect whether said any one cartridge, of said plurality of cartridges, is present or absent, and to thereby confirm what number of said plurality of cartridges have been loaded through a display onto said cartridge receiver means.

18. The automatic cartridge-exchanging apparatus as claimed in claim 16, wherein said partition means are formed in such a manner that a cross-sectional area of said partition means is smaller than a cross-sectional area of said any one of said plurality of cartridges, an upper length of said partition means is shorter than a lower length of said partition means, and a side of said partition means is curved and slanted.

19. The automatic cartridge-exchanging apparatus as claimed in claim 16, wherein a false-loading preventing stop is formed on an upper right portion of said cartridge receiver means, so as to detect when a receiving direction of said any one of said plurality of cartridges is not proper.

20. The automatic cartridge-exchanging apparatus as claimed in claim 16, wherein said cartridge holder means moves by a lead screw of said sixth shaft means.

21. The automatic cartridge-exchanging apparatus as claimed in claim 20, wherein a holder bracket is fixedly installed on a bottom of said cartridge holder means so that said cartridge holder means does not rotate around said sixth shaft means.

22. The automatic cartridge-exchanging apparatus as claimed in claim 16, wherein in order to load/unload said cartridge, a light receiving sensor is provided in respective booths in said cartridge holder portion so that said holder hook means of said cartridge holder means move exactly to a position of said recesses of said any one of said plurality of cartridges.

23. The automatic cartridge-exchanging apparatus as claimed in claim 16, further comprising a second positioner connected to a cartridge guide and inserted into said second shaft means so as to allow said cartridge holder means to reciprocate around said second shaft means, and a first, third and fourth shaft means serve as guides, said second shaft means being rotated by said first motor, a gear portion, and a clutch capable of turning a transmission of energy to said first and second motors on and off.

* * * * *